United States Patent Office 3,342,080
Patented Sept. 19, 1967

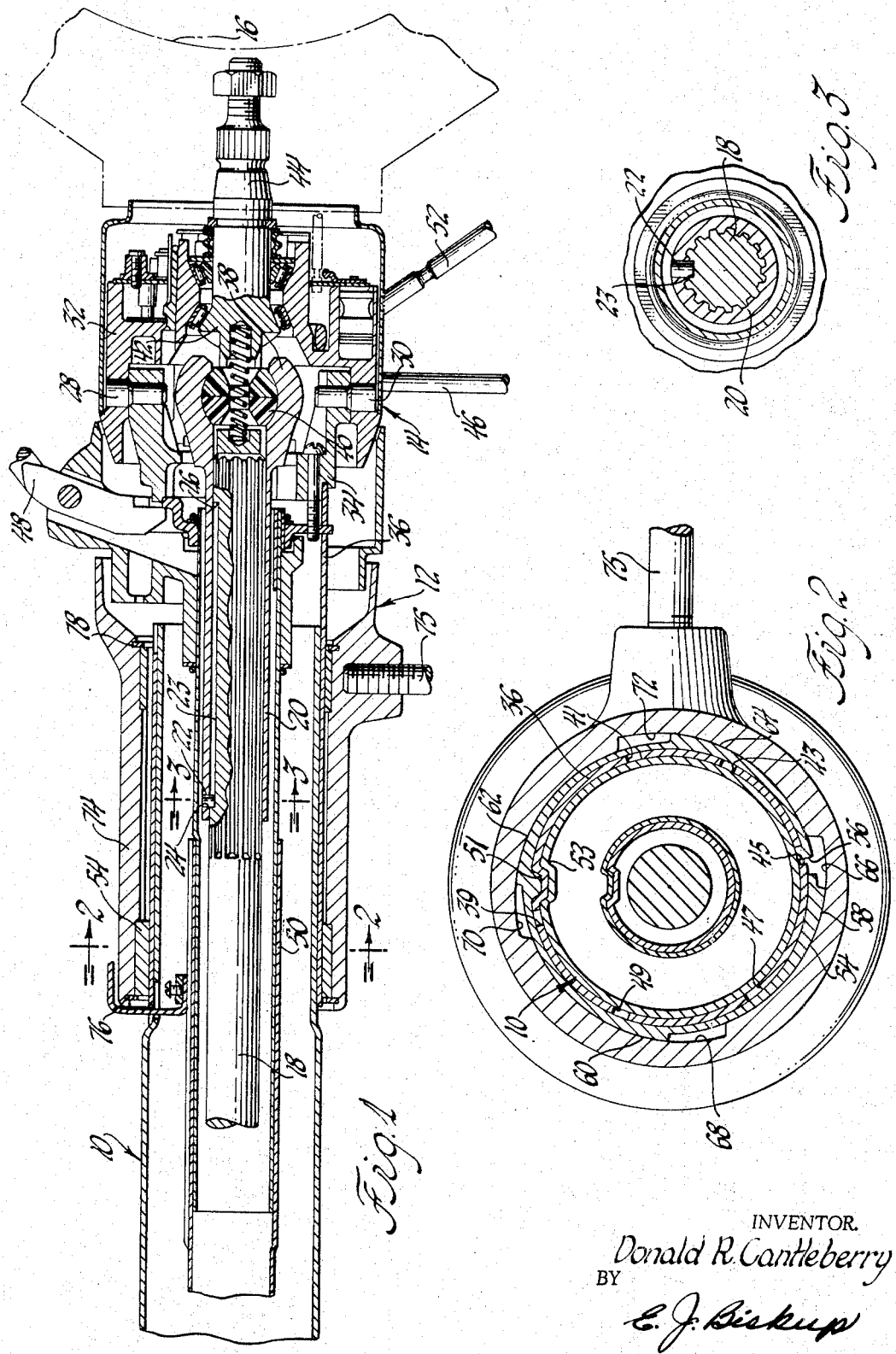

3,342,080
TILT AND TELESCOPING STEERING WHEEL
Donald R. Cantleberry, Fenton, Mich., assignor to General Motors Corporation, Detroit, Mich., a corporation of Delaware
Filed Apr. 29, 1965, Ser. No. 451,925
10 Claims. (Cl. 74—493)

ABSTRACT OF THE DISCLOSURE

A tilt and telescoping steering assembly having an upper column supported by a lower column for axial movement between two extreme positions. The upper column includes the tilt mechanism for adjusting the steering wheel about a horizontal axis, and also has means incorporated therewith for locking the lower column to the upper column when the latter is located in the desired position between said two extreme positions.

---

This invention concerns a steering mechanism and more particularly a steering assembly having adjusting mechanism for permitting angular tilting of the steering wheel and also allowing longitudinal adjustment thereof so that the steering wheel can assume various positions relative to the vehicle operator.

One object of this invention is to provide an improved tilt and steering wheel assembly. Another object is to provide an adjustable steering wheel assembly in which the transmission, turn signal and other controls are mounted on the adjustable portion of the steering column so as to maintain a fixed relationship between the controls and the steering wheel in all positions of the latter. A still further object is to provide a compound steering wheel adjustment which enables selective adjustment of the steering wheel position both angularly and longitudinally so that a wide range of composite or separate wheel adjustments are available to the operator. Still another object is to provide a locking means for a telescoping mechanism that is simple and inexpensive to manufacture and durable in operation.

Stated broadly, the above and other objects of the invention are accomplished by a steering assembly comprising a fixed lower column which supports a lower steering shaft. An upper column is supported by the lower column for axial movement between two extreme positions and includes an upper steering shaft which is splined to the lower steering shaft. The steering wheel is connected to the upper steering shaft by a tilt mechanism so that the steering wheel can be pivotally movable about a horizontal axis, and means are provided on the upper column for locking the latter to the lower column after the upper column is adjusted to a desired position between the aforementioned two extreme positions.

A more complete understanding of the present invention will become more apparent from the following detailed description when taken in view of the drawing in which:

FIGURE 1 is a sectional view of a tilt and telescoping steering assembly made in accordance with the invention;
FIGURE 2 is a view taken on line 2—2 of FIGURE 1, and
FIGURE 3 is a view taken on line 3—3 of FIGURE 1.

Referring to the drawing, the steering mechanism made in accordance with the invention comprises a fixed lower column 10 which slidably supports an upper column 12 that includes a tilt mechanism 14 terminating with a steering wheel 16. A lower steering shaft 18 is rotatably journaled in the lower column 10 and is connected to an upper steering shaft 20 through a spline connection which permits relative axial movement between the steering shafts. A key 22 located in a longitudinal groove 23 suitably interconnects the steering shafts 18 and 20 and is adapted to be moved in a manner to be described between shoulders 24 and 26 formed on the lower steering shaft.

The tilt mechanism 14 associated with the upper column is identical to that shown in copending patent application entitled "Adjustable Steering Column," Ser. No. 221,833, filed Sept. 6, 1962, now Patent No. 3,167,971, and assigned to the assignee of this invention. A complete description of the tilt mechanism 14 can be obtained from the aforementioned application; however, for present purposes, it will suffice to mention that the steering wheel 16 is adapted to be adjusted through the tilt mechanism about a horizontal axis that passes through axially aligned trunnions 28 and 30. The trunnions serve to interconnect a housing portion 32 with a skirt portion 34 which in turn is rigidly connected to an inner jacket 36 that envelopes a portion of the lower column 10. The upper end of the steering shaft 20 is formed with a yoke 38 which accommodates a slit cross-slotted ball member 40 which maintains free rotational engagement between the yoke 38 and a similar yoke 42 formed on the inner end of a stub shaft 44 which supports the steering wheel 16. A tilt lever 46 is suitably associated with the tilt mechanism 14 and is adapted to be raised by the vehicle operator for purposes of releasing a latching mechanism so that the steering wheel 16 can be tilted about the aforementioned horizontal axis.

It will be noted that in addition to the tilt lever 46, the upper column 12 pivotally supports a transmission selector lever 48 which has the inner end thereof connected to a shift tube 50 which leads to appropriate mechanism for controlling the transmission. A turn signal control lever 52 is also located on the upper column 12 and has the inner end thereof connected to conventional mechanism (not shown) which serves to energize and cancel energization of the appropriate turn signal lamps in the well-known manner.

As seen in FIGURE 2, the lower end of the inner jacket 36 is formed with a plurality of longitudinal slits 39, 41, 43, 45, 47 and 49 circumferentially spaced about the jacket. A longitudinal depressed portion 51 is also formed in the jacket along the length thereof and is accommodated by a similarly shaped well 53 located in the lower column so as to preclude relative rotation between the latter and the upper column. Surrounding the inner jacket 36 is a split lock collar 54 which has one end thereof formed with a tab 56 that is located in the slit 45. The lock collar 54 has the peripheral surface thereof formed with arcuate ramps having cam surfaces 58, 60, 62 and 64 which are respectively located in ramp-shaped depressions having cam surfaces 66, 68, 70 and 72 formed in the lower end of a lock member 74 which is rotatably supported on the inner jacket 36. As seen in FIGURE 1, the lock member is fitted with a handle 75 and is held from axial movement relative to the jacket 36 by snap rings 76 and 78.

Thus by rotating the lock member 74 counterclockwise as seen in FIGURE 2, the lock collar 54 is squeezed or cammed into gripping engagement with the inner jacket 36. Inasmuch as the jacket is slit at this end, it flexes radially inwardly into locked engagement with the lower column 10 so that the upper column 12 is then in fixed relative position with respect to the lower column. It should be apparent that by rotating the lock member 74 in a clockwise direction, as shown in FIGURE 2, the lock collar 54 is permitted to expand so as to release its gripping action on the jacket 36. Thereafter, the steering wheel 16 together with the upper column 12 can be moved axially relative to the fixed lower column between two extreme positions as provided by the shoulders 24 and 26. Once the desired position of the steering wheel 16 is obtained, the handle 75 is again rotated in the proper direction so as to lock the upper column to the lower column as aforedescribed. It will be noted that during adjustment of the upper column, the control levers 46, 48, 52 and 75 maintain a fixed relationship with respect to the steering wheel 16. Hence, the driver can obtain telescoping adjustment of the steering wheel 16 or tilting thereof about a horizontal axis without losing the normal relationship existing between the control levers and the steering wheel.

Various changes and modifications can be made in this construction without departing from the spirit of the invention. Such changes and modifications are contemplated by the inventor and he does not wish to be limited except by the scope of the appended claims.

I claim:

1. A tilt and telescoping steering assembly comprising a fixed lower column supporting a lower steering shaft, an upper column supported by the lower column for axial movement between two extreme positions, said upper column having an upper steering shaft splined to said lower steering shaft, a steering wheel, a tilt mechanism connecting said upper steering shaft with said steering wheel and located therebetween whereby the latter is pivotally movable about a horizontal axis for operation at various angles with respect to the upper steering shaft and the lower column, and said upper column including means for locking the upper column to the lower column after the upper column is adjusted to a desired position between said two extreme positions.

2. A tilt and telescoping steering assembly comprising a fixed lower column supporting a lower steering shaft, an upper column supported by the lower column for axial movement between two extreme positions, said upper column having an upper steering shaft splined to said lower steering shaft, a steering wheel, a tilt mechanism connecting said upper steering shaft with said steering wheel and located therebetween whereby the latter is pivotally movable about a horizontal axis for operation at various angles with respect to the upper steering shaft and the lower column, and said upper column including means supported for rotation about the longitudinal axis of the lower column for locking the upper column to the lower column after the upper column is adjusted to a desired position between said two extreme positions.

3. A tilt and telescoping steering assembly comprising a fixed lower column supporting a lower steering shaft, an upper column supported by the lower column for axial movement between two extreme positions, said upper column having an upper steering shaft splined to said lower steering shaft, a steering wheel, a tilt mechanism connecting said supper steering shaft with said steering wheel whereby the latter is pivotally movable about a horizontal axis for operation at various angles with respect to the lower column, and said upper column including locking means having cooperating camming surfaces supported for rotation about the longitudinal axis of the lower column for locking the upper column to the lower column after the upper column is adjusted to a desired position between said two extreme positions.

4. A tilt and telescoping steering assembly comprising a fixed lower column supporting a lower steering shaft, an upper column supported by the lower column for axial movement between two extreme positions, said upper column having an upper steering shaft splined to said lower steering shaft, a steering wheel, a tilt mechanism connecting said upper steering shaft with said steering wheel whereby the latter is pivotally movable about a horizontal axis for operation at various angles with respect to the lower column, said upper column including means for locking the latter to the lower column after the upper column is adjusted to a desired position between said two extreme positions, said means comprising a longitudinally slotted inner jacket, a lock member mounted on the inner jacket for rotation about the longitudinal axis of the lower column, and a slit collar member interposed between the inner jacket and lock member and so formed that rotation of the latter in one direction locks the upper column to the lower column while rotation in the opposite direction unlocks the columns to permit axial adjustment of the upper column between said two positions.

5. A telescoping steering assembly comprising a fixed lower column supporting a lower steering shaft, an upper column supported by the lower column for axial movement relative to the latter between two extreme positions, an upper steering shaft housed by said upper column and having the lower end thereof splined to said lower steering shaft, said upper column including an inner jacket encompassing a portion of the lower column, a plurality of longitudinal slots circumferentially formed in said inner jacket, a lock member supported by said inner jacket for rotation about the longitudinal axis of the upper column, a slit collar member interposed between said inner jacket and lock member, and cooperating cam surfaces formed on said lock member and said collar member whereby rotation of said lock member in one direction causes said collar to circumferentially compress said slotted inner jacket to lock the latter to the lower column while rotation in the opposite direction unlocks the inner jacket to permit axial adjustment of the upper column between said two positions.

6. A telescoping steering assembly comprising a fixed lower column supporting a lower steering shaft, an upper column supported by the lower column for axial movement relative to the latter between two extreme positions, an upper steering shaft housed by said upper column and having the lower end thereof splined to said lower steering shaft, said upper column including an inner jacket encompassing a portion of the lower column, a plurality of equally spaced longitudinal slots circumferentially formed in said inner jacket, a lock member supported by said inner jacket for rotation about the longitudinal axis of the upper column, a slit collar member interposed between said inner jacket and lock member and having one end thereof located in one of said slots, and cooperating cam surfaces formed on said lock member and said collar member whereby rotation of said lock member in one direction causes said collar to circumferentially compress said slotted inner jacket to lock the latter to the lower column while rotation in the opposite direction unlocks the inner jacket to permit axial adjustment of the upper column between said two positions.

7. A telescoping steering assembly comprising a fixed lower column supporting a lower steering shaft, an upper column supported by the lower column for axial movement relative to the latter between two extreme positions, an upper steering shaft housed by said upper column and having the lower end thereof splined to said lower steering shaft, said upper column including an inner jacket encompassing a portion of the lower column, a plurality of longitudinal slots circumferentially formed in said inner jacket, a lock member supported by said inner jacket for rotation about the longitudinal axis of the upper column, a slit collar member interposed between said inner jacket and lock member, cooperating cam surfaces formed on said lock member and said collar member whereby rotation of said lock member in one direction causes said collar to circumferentially compress said slotted inner jacket to lock the latter to the lower column while rotation in the opposite direction unlocks the inner jacket to permit axial adjustment of the upper column between said two positions, and manually operable means radially extending from said lock member for rotating the latter between locked and unlocked positions.

8. A tilt and telescoping steering assembly comprising a fixed lower column supporting a lower steering shaft, an upper column supported by the lower column for axial movement relative to the latter between two extreme positions, an upper steering shaft housed by said upper column and having the lower end thereof splined to said lower steering shaft, a steering wheel, a tilt mechanism connecting said upper steering shaft with said steering wheel whereby the latter is pivotally movable about a horizontal axis for operation at various angles with respect to the lower column, said upper column including an inner jacket encompassing a portion of the lower column, a plurality of longitudinal slots circumferentially formed in said inner jacket, a lock member supported by said inner jacket for rotation about the longitudinal axis of the upper column, a slit collar member interposed between said inner jacket and lock member, and cooperating cam surfaces formed on said lock member and said collar member whereby rotation of said lock member in one direction causes said collar to circumferentially compress said slotted inner jacket to lock the latter to the lower column while rotation in the opposite direction unlocks the inner jacket to permit axial adjustment of the upper column between said two positions.

9. The device of claim 8 wherein the cam surfaces are formed as arcuate ramps.

10. A tilt and telescoping steering assembly comprising a fixed lower column supporting a lower steering shaft, an upper column supported by the lower column for axial movement relative to the latter between two extreme positions, an upper steering shaft housed by said column and having the lower end thereof splined to said lower steering shaft, a steering wheel, a tilt and locking mechanism connecting said upper steering shaft with said steering wheel whereby the latter is adjustably movable about a horizontal axis for operation at various angles with respect to the lower column, said upper column including an inner jacket encompassing a portion of the lower column, a plurality of equally spaced longitudinal slots circumferentially formed in said inner jacket, a lock member supported by said inner jacket for rotation about the longitudinal axis of the upper column, a slit collar member interposed between said inner jacket and lock member and having one end thereof located in one of said slots, cooperating cam surfaces formed on said lock member and said collar member whereby rotation of said lock member in one direction causes said collar to circumferentially compress said slotted inner jacket to lock the latter to the lower column while rotation in the opposite direction unlocks the inner jacket to permit axial adjustment of the upper column between said two positions, and manually operable means radially extending from said lock member for rotating the latter between locked and unlocked positions.

References Cited

UNITED STATES PATENTS

| 3,144,785 | 8/1964 | Steiner et al. | 74—493 |
| 3,245,282 | 4/1966 | Kimberlin | 74—493 |
| 3,267,766 | 8/1966 | Glover et al. | 74—493 |

FOREIGN PATENTS

| 851,770 | 10/1960 | Great Britain. |

MILTON KAUFMAN, *Primary Examiner.*